United States Patent [19]
Yoshino et al.

[11] Patent Number: 5,574,544
[45] Date of Patent: Nov. 12, 1996

[54] IMAGE FORMING APPARATUS HAVING IMAGE DENSITY GRADATION CORRECTION MEANS

[75] Inventors: Kunihisa Yoshino; Mitsuo Motohashi; Satoshi Nishida; Akira Takahashi, all of Hachioji, Japan

[73] Assignee: Konica Corporation, Tokyo, Japan

[21] Appl. No.: 517,535

[22] Filed: Aug. 21, 1995

[30] Foreign Application Priority Data

Aug. 29, 1994 [JP] Japan .................................. 6-203798

[51] Int. Cl.$^6$ ................................................ G03G 15/00
[52] U.S. Cl. ............................ 399/60; 358/458; 358/519; 358/521
[58] Field of Search .................................. 358/298, 458, 358/521, 406, 504, 519; 355/246, 208, 207

[56] References Cited

U.S. PATENT DOCUMENTS 4,792,979 12/1988 Nomura et al. ........................ 358/54
5,258,783 11/1993 Sasanuma et al. ................. 358/519 X

FOREIGN PATENT DOCUMENTS 1-41375 2/1989 Japan .

Primary Examiner—Arthur T. Grimley
Assistant Examiner—Sophia S. Chen
Attorney, Agent, or Firm—Frishauf, Holtz, Goodman, Langer & Chick

[57] ABSTRACT

An image forming apparatus includes an image carrier on which a plurality of latent patch images are formed by exposure of different luminance, and the latent patch images are developed to form toner patch images. The apparatus further includes a gradation correction curve forming device in which a gradation correction curve is made from reflection density data of the patch toner image. The correction curve is formed, and gradation correction processing is conducted in accordance with the correction curve, so that an image forming process can be carried out. Further, when the correction curve cannot be obtained, at least one predetermined gradation curve stored in a memory in advance is selected as a substitution for the correction curve.

2 Claims, 8 Drawing Sheets

IMAGE FORMING APPARATUS HAVING IMAGE DENSITY GRADATION CORRECTION MEANS

BACKGROUND OF THE INVENTION

The present invention relates to an image forming apparatus including a density detection means for detecting a reflection density of a patch toner image formed in the image carrier so that the density of a formed image can be stabilized.

In an electrophotographic image forming apparatus, in order to prevent the deviation of density of a formed image, image density is detected from the reflection density data of an image that has been fixed. The efficiency of the above image forming apparatus is not high from the viewpoint of conserving natural resources because transfer sheets are used for the detection of image density, and further the image productivity is not so high. In order to solve the above problems, there is provided an image forming apparatus in which the deviation of image density is prevented in the following manner. A patch toner image is formed on the image carrier, and then the formed toner image is made to be visual. Using the visual patch toner image, while consideration is given to a difference between the image density on the image carrier and the image density on a transfer sheet, the image density is calculated. In this way, the deviation of image density of the formed image can be prevented.

As one of the image forming apparatus in which image density is detected as described above, there is provided an apparatus in which a plurality of gradation correction curves are prepared and the most appropriate gradation correction curve is selected in accordance with the detected image density. However, the number of the gradation correction curves stored in the apparatus is limited. Therefore, it is impossible to conduct an accurate gradation correction.

SUMMARY OF THE INVENTION

The first object of the present invention is to solve the above problems and to carry out the gradation correction. In order to solve the above problems, it is possible to adopt a method in which a gradation correction curve is made by the calculation based on the image density that has been detected. The image forming apparatus of the present invention is characterized in that: a plurality of latent patch images are formed on the image carrier by the exposure of different luminances; the thus obtained latent patch images are developed; and a gradation correction curve is made from the reflection density data of the patch toner image. In the above image forming apparatus, the correction curve is normally formed, and gradation correction processing is conducted in accordance with the correction curve, so that the image formation process can be carried out. According to this method, it is possible to carry out the gradation correction more accurately.

However, when this method is adopted, the following problem may be encountered.

For example, in the case of radio wave interference caused in an office, abnormal data is detected by the image density sensor. Therefore, it is impossible to obtain an appropriate image correction curve.

FIGS. 10(a) and 10(b) are graphs showing an example of the occurrence of abnormality of the output of the image density sensor. FIG. 10(a) is a graph showing a sensor output, and FIG. 10(b) is a graph showing a conversion from the output of the sensor to the image density data. In this case, FIG. 10(a) shows that abnormal data is detected by the image density sensor at the levels of PWM80 and PWM224. PWM is defined as an abbreviation of Pulse Width Modulation in this specification, hereinafter. FIG. 10(b) is graph obtained when the sampling data is subjected to logarithmic conversion and the data is expressed in the form of a relation between the image density and the PWM level. In this case, the sampling data is discontinued, so that discontinuity of gradation occurs in the provided image. Depending on the output of the image density sensor, only white and black sheets are outputted because of an abnormality of the sensor in which the image density sensor output is not changed. In this case, the image forming apparatus displays the occurrence of an error, and the operation of the image forming apparatus is stopped. Therefore, the image forming apparatus can not start until the arrival of a service man. When the abnormal operation is caused only by the image density sensor, the operation of the image forming apparatus is stopped over a long period of time, which is inconvenient to the user.

On the other hand, when the apparatus is controlled in such a manner that the gradation correction curve is made only when the fixing temperature is low, the following problems may be encountered. In some cases, in the operation test conducted on a manufacturing line, all process units are not assembled. Therefore, when the power supply is previously turned on and the fixing temperature is raised, appropriate sampling data can not be obtained in the warm-up operation even if all image formation process units are assembled. Accordingly, it is impossible to continue the image formation process. Therefore, problems are caused in the operation test on the manufacturing line.

The second object of the present invention is to provide an image forming apparatus in which the image forming operation can be continued irrespective of the occurrence of a trouble in the sampling data composing the gradation correction curve.

In order to accomplish the above second object, a preparatory gradation correction curve is prepared in the memory means. Even when the correction curve can not be obtained due to a trouble in the output of image density sensor, or even when the correction curve can not be obtained due to the warm-up operation of the apparatus, at least one predetermined gradation correction curve (referred to as a backup correction curve hereinafter in this specification) is selected. When the backup correction curve is called out in this way, the image forming operation can be continued.

DETAILED DESCRIPTION OF THE PREFERRED EMBODIMENT

Figure 1:
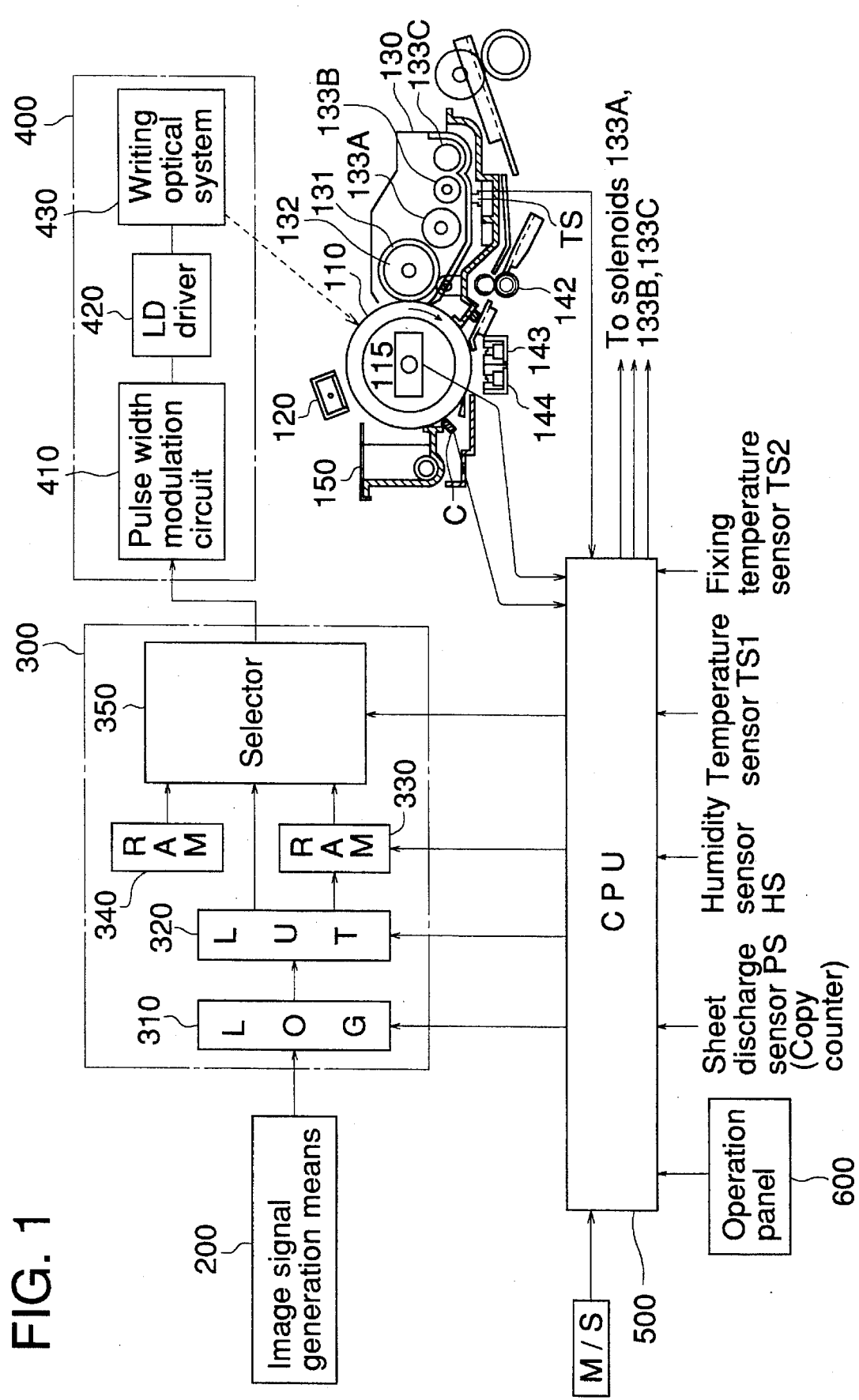
FIG. 1 is a block diagram showing an example of the image forming apparatus of the present invention.

FIG. 1 is a block diagram showing an example of the image forming apparatus of the present invention.

The image forming apparatus of this example employs an electrophotographic method in which the light emitting time of a semiconductor laser is changed in accordance with a density signal sent from the image signal generation means 200 such as a scanner or a personal computer so that the gradation recording can be conducted. In this way, the pulse width modulation is carried out in the exposure process. In this image forming apparatus, the operation is conducted as follows. A test patch signal $S_G$ is read out from the RAM 340 in accordance with a copy start command. According to the test patch signal $S_G$, a plurality of the same latent images of the test patch are formed by the exposure of PWM255 (the maximum exposure amount) conducted on the image carrier 110. The thus formed latent images are developed while the rotational speed of the developing sleeve 131 is changed so that the latent images can be made to be visual. By the luminance signal corresponding to the intensity of light detected by the image density sensor C, the actual image density is detected, so that the development characteristic is fixed. For example, test patches expressing 256 gradations are made, and they are made to be visual images by the development in which the developing sleeve is rotated at a speed predetermined by the development characteristic. The image forming apparatus of this example includes: a means for fixing the development characteristic in the above manner; a printer characteristic detection means for detecting the printer characteristic from the luminance signal sent from the image density sensor C; and a gradation control means for correcting the gradation of a recording signal, wherein CPU500 functions as the gradation control means in this example. The primary structure of this image forming apparatus of this example will be explained as follows.

The image processing section includes LOG310, LUT320, RAM330, RAM340, and Selector 350. The printer characteristic obtained from the test patch in which the gray scale is made to be visual, is normalized on the basis of the maximum image density, so that the gradation can be corrected.

In LOG310, table data composed of a pair of pieces of data is written. LOG310 is selected when a density selection button provided on the operation panel 600 is pressed. LUT320 sends a recording signal expressing the PWM level to the writing unit 400 or RAM330 since table data composed of a pair of pieces of data of PWM-density is written in LUT320 so as to obtain data reverse to the detected density data.

Figure 7:
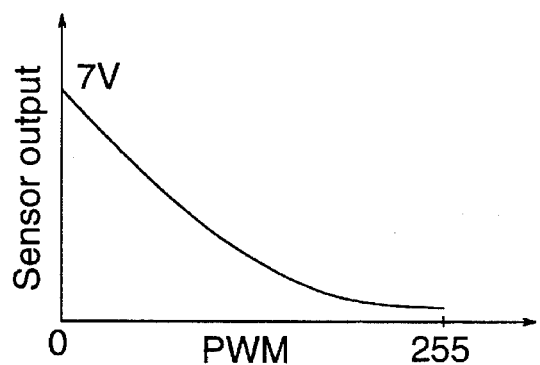
FIGS. 7(a), 7(b) and 7(c) are graphs showing a procedure for generating a gradation correction curve from a patch toner image formed on the image carrier.
Figure 7:
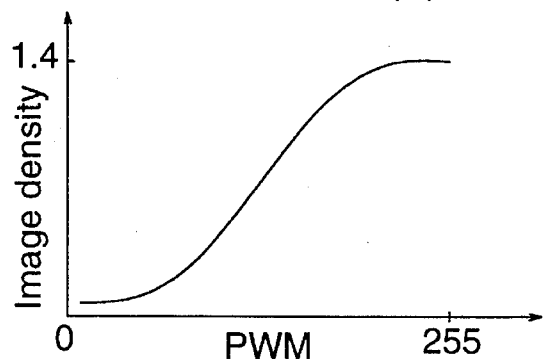
Figure 7:
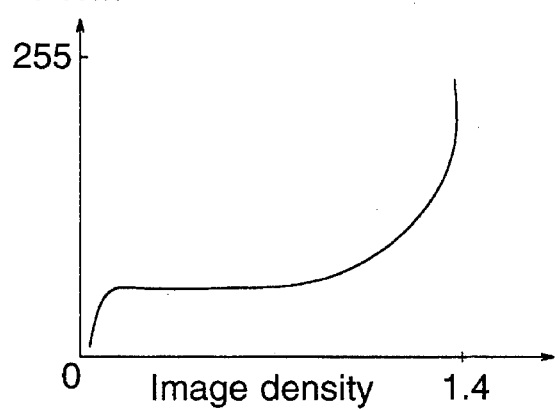

In RAM 330, the correction curve (referred to as a backup correction curve hereinafter) is previously written. A plurality of correction curves may be prepared, for example, correction curves may be prepared when consideration is given to a change in the characteristic of developer or photoreceptor caused by the environmental fluctuation, or alternatively correction curves may be prepared when consideration is given to the deterioration with age. The backup correction curve can be automatically read out when an abnormal output of the image density sensor is detected, or alternatively the backup correction curve can be selectively read out through the operation panel. In this case, the output abnormality is defined as follows. As illustrated in FIG. 7(a), even when the PWM level is raised, the sensor output is not lowered as it is designed, or alternatively the sensor output is raised, or alternatively the sensor output is constant at all times. Since CPU500 controls the sensor output, the abnormal sensor output described above is discovered by CPU500.

In RAM340, the test patch data (shown in FIGS. 5 and 6) is written. In this case, the test patch data represents either the test patch expressing 256 gradations, the density piece expressing the maximum image density by the printer characteristic under the condition of normal temperature and normal humidity (for example 20° C. and 50%), or the density piece expressing the intermediate density.

In accordance with the selection signal sent from CPU500, the selector 350 outputs either the test patch signal $S_G$ sent from RAM 340, the density signal sent from LUT320, or the density signal sent from RAM330.

The writing unit 400 includes a pulse width modulation circuit 410, an LD driver 420, and a writing optical system 430. A semiconductor laser is oscillated by the modulation signal in which recording signals corresponding to one scanning line are subjected to pulse width modulation. The direction of a laser beam is changed by a polygonal mirror rotating at a predetermined speed. For example, in accordance with the recording signal, the test patch signal $S_G$ that has been read out from RAM340, or the density signal of RAM330, light is emitted by the semiconductor laser. By the actions of the fθ lens, the first cylindrical lens and the second cylindrical lens, light emitted from the semiconductor lens conducts scanning on the image carrier 110 so that a latent image can be formed. In this way, the image exposure process is carried out.

In the pulse width modulation circuit 410, the reference wave and the analog recording signal D/A-converted from the recording signal composed of predetermined bits are compared, so that the data can be made to be multi-values. The thus obtained modulation signal becomes a drive signal of the writing driver 420.

The writing driver 420 includes an LD drive circuit, an index sensor and an index detection circuit used as a synchronizing system, and a polygonal driver used as a reflection optical system. The LD drive circuit oscillates the semiconductor laser according to the modulation signal A signal corresponding to an amount of beam of light sent from the semiconductor laser is fed back, so that the amount of light can be constant. In this case, an intensity of electric current allowed to flow in the semiconductor laser can be changed. Due to the foregoing, an electric potential of the latent image can be adjusted. In the synchronizing system, the beam of light sent from the reflection optical system is incident on the index sensor through a reflecting mirror. The index sensor outputs an electric current in response to the beam of light. This electric current is converted into a voltage in the index detection circuit, so that the index signal is outputted. By this index signal, a surface position of the polygonal mirror rotating at a predetermined speed is detected, and optical scanning is conducted in accordance with a modulation signal by the raster scanning system in the period of primary scanning.

In the writing optical system 430, a laser beam is reflected by the polygonal mirror rotating at a predetermined speed. Then the laser beam passes through the fθ lens, the first cylindrical lens and the third cylindrical lens. In this way, a minute spot is formed on the image carrier, and scanning is carried out by this minute spot. A collimator lens functions as a unit provided in the modulation optical system. The polygonal mirror and the fθ lens function as units provided in the reflection optical system. The first and second cylindrical lenses function as units provided in the polygonal mirror tilt correction optical system.

CPU500 includes a RAM (not shown) in which a program to carry out the electrostatic photography process and a program to compose the developing property fixing means are written. CPU500 is provided with a function for processing various signals sent from the control panel 600. CPU500 is connected with a sheet discharge sensor PS to detect the discharge of recording sheets, a humidity sensor HS to detect the humidity in the apparatus, a temperature sensor TS1 to detect the temperature in the apparatus, and a temperature sensor TS2 to detect the surface temperature of the fixing roller.

It is possible to use the output of the sheet discharge sensor PS for detecting the number of copy sheets. However, in this example, the output of the sheet discharge sensor PS is used to estimate the deterioration with time of the developer and image carrier. The humidity sensor HS and the temperature sensor TS1 are used for detecting the environmental fluctuation in the apparatus. The temperature sensor TS2 is used to detect that the apparatus is in a warmup condition.

In this connection, CPU500 is connected to a solenoid for driving the agitating screws 133A to 133C through a driver (not shown).

CPU500 includes another RAM in which a program composing the printer characteristic detection means and the maximum image density conversion means is written.

The printer characteristic detection means includes an image density sensor C, CPU500, and RAM340 in which the test patch signal $S_G$ is written. By the printer characteristic detection means, the actual printer characteristic and the maximum image density can be detected. The program includes a program corresponding to the maximum image density conversion means.

The program corresponding to the image density detection means is used for obtaining a signal which can be provided from a value obtained as follows. That is, the value is obtained when a ratio of the output voltage normalized into 256 gradations by A/D converting a luminance signal, to the rating maximum output (the output under the condition that no toner is deposited on the image carrier) of the image density sensor is subjected to logarithmic conversion. In this case, consideration is given to a difference between the density of the image carrier 110 and the density of the transfer sheet. The method is described as follows. In order to avoid the detection error caused when the image carrier 110 is rotated, for example, a luminance signal obtained from a plurality of test patches that have been made to be visual on the image carrier 110 is subjected to a predetermined processing so as to compute an average value (shown in Japanese Patent Publication Open to Public Inspection No. 41375/1989). Due to the foregoing, CPU500 detects the printer characteristics and the maximum image density from which the detection errors caused by the vibration of the image carrier 110 are removed.

CPU500 is a toner concentration control system for controlling the toner concentration to be constant by a change in the magnetic permeability irrespective of development property. Unlike a means for optically detecting an amount of development of the image carrier, this toner concentration control system is not affected by a change in the sensitivity characteristic of the photosensitive layer. Accordingly, when the rotational speed of the development sleeve 131 is variably adjusted, the developing property can be maintained to be constant in the reversal development method.

The toner concentration control means controls the toner concentration to be approximately constant in the following manner. The magnetic permeability of developer charged into the developing unit 130 is detected with the toner concentration sensor TS. According to the result of detection, a toner replenishing unit (not shown) is driven so as to control the toner concentration.

By the program composing the developing property fixing means, the rotational speed of the developing sleeve 131 is controlled in accordance with the patch toner image 1 made to be visual on the image carrier 110, so that the developing property exceeding the photosensitive characteristic of the photosensitive layer can be provided. While the toner concentration closely relating to the developing property is controlled to be constant, the rotational speed of the developing sleeve 131 is controlled so that an amount of developer deposited on the surface of the image carrier 110 in the developing region can be changed so as to adjust the maximum image density. In the case where two-component type developer is employed, the program composing the developing property fixing means includes a mechanism for controlling the toner concentration in the developer tank to be constant and also includes a control program.

In the explanation of this example, only one CPU 500 drives the above various programs. However, it should be noted that the present invention is not limited to the specific example, and not less than two sets of CPU may be provided in parallel.

The operation panel 600 is composed, for example, of a touch-display. Through the operation panel 600, the copying magnification, the number of copied sheets and the start of copying operation are commanded, and the content of operation can be displayed on the operation panel.

The image carrier 110 is composed in such a manner that a photosensitive layer is provided in the surface of a conductive base member made of aluminum. The film thickness of the photosensitive layer is 15 to 30 μm, and the dielectric constant is 2.0 to 5.0. The conductive base member is grounded. The image carrier 110 is composed of a drum-shaped photoreceptor on which a coating type OPC of negative charging is coated. In this case, the diameter of the image carrier is 80 mm, and it is rotated in the arrowed direction at the linear speed of 280 mm/sec. An encoder 115 to detect the rotational phase is mounted on a rotational shaft of the image carrier 110. The encoder 115 sends a phase signal indicating the phase of the image carrier 110.

In the circumferential periphery of the image carrier 110, there are provided a charging unit 120, developing unit 130, a transferring unit 143, separating unit 144 and cleaning unit 150. Further, there is provided a sheet feed system including a sheet feed tray, registration roller 142 and conveyance belt.

For example, a scorotron charger is employed for the charging unit 120. Previously to the latent image forming process, the image carrier 110 is uniformly charged to be a predetermined voltage, and the gradation reproducing property is adjusted, so that the occurrence of fog is prevented.

By the developing unit 130, a latent image in the developing region is made visual as follows. Toner particles made of polyester, the average particle size of which is 8.5 μm, and carrier particles made of ferrite, the average particle size of which 60 μm, are mixed to be a developer in which the toner concentration is controlled to be 4 to 6%. When the stirring screws 133A, 133B, 133C are rotated at the rotational speed of 120 rpm, the developer is mixed. After that, a magnetic brush is formed on the outer circumference of a sleeve 131 rotating at the rotational speed of 400 or 180 rpm, wherein the sleeve 131 is disposed outside the magnetic roller 132. A predetermined bias voltage is impressed upon the developing sleeve 131, and the latent image in the developing region is developed to be a visual image.

The developing unit 130 is composed as follows. At a position close to the opening of a casing 300 which is opposed to the image carrier 110, a magnetic roller 132 covered with a sleeve 131, the diameter of which is 40 mm, is arranged, wherein a rotational shaft of the magnet roller 132 is inserted into the side walls of the casing 300. At the rear of the magnet roller 132, the drive shafts of stirring screws 133A, 133B, 133C, the diameters of which are 16 mm, are inserted into the side walls of the casing 300. When the drive shafts of the sleeve 131 and the stirring screws 133A, 133B, 133C are connected to a drive system (not shown) through a gear mechanism, the rotational speed can be changed. This rotational speed control operation is carried out in accordance with a command given by CPU500. For example, when the rotational speed of the rotational shaft of the sleeve 131 is changed to 200, 250 and 300 rpm, the maximum image density is controlled so that it can be fixed.

As is well known, in the transfer unit 143, a transfer sheet P is put onto a toner image electrostatically formed on the image carrier 110, and the reverse side of the transfer sheet P is electrically discharged, so that the toner image is transferred onto the transfer sheet P. In this case, the scorotron charger is preferably used, however, it should be noted that the present invention is not limited to the specific example. As long as the toner image can be electrostatically transferred onto the transfer sheet P, a unit such as a charging roller may be used.

As is well known, the separating unit 144 electrically discharges the transfer sheet P electrostatically attracted onto the image carrier 110 so that the transfer sheet P can be separated from the surface of the image carrier 110. The scorotron charger, scorotron charger and charging roller may be used for the separating unit 144.

In the cleaning unit 150, a blade is contacted with the surface of the image carrier 110, so that toner and dust deposited on the surface of the image carrier can be scraped off and collected into a used toner box.

As is well known, in the fixing unit (not shown), after the separation of the transfer sheet P from the image carrier, heat or heat and pressure are given to the transfer sheet P so that the toner image can be fixed onto the transfer sheet P.

In this example, an image density sensor $C_1$ is used for the maximum image density control, and an image density sensor $C_2$ is used for the γ correction control. With reference to FIGS. 2(a), 2(b), 3(a) and 3(b), the structure of each image density sensor will be explained as follows.

Figure 2:
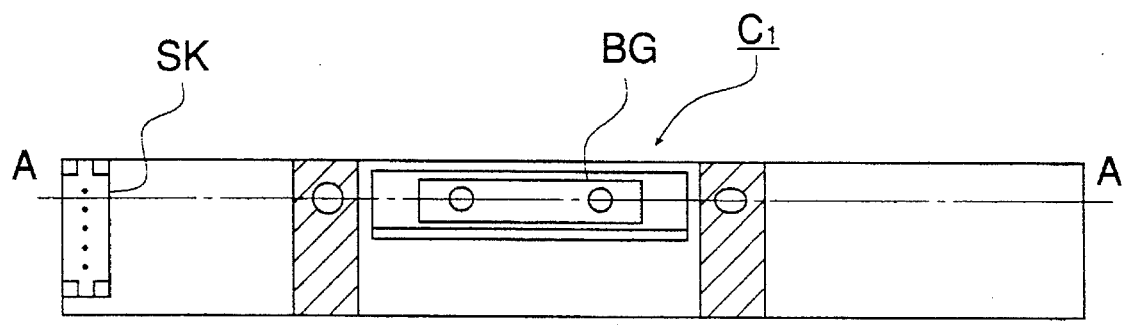
FIGS. 2(a) and 2(b) are views showing an image density sensor $C_1$ of this example.
Figure 2:
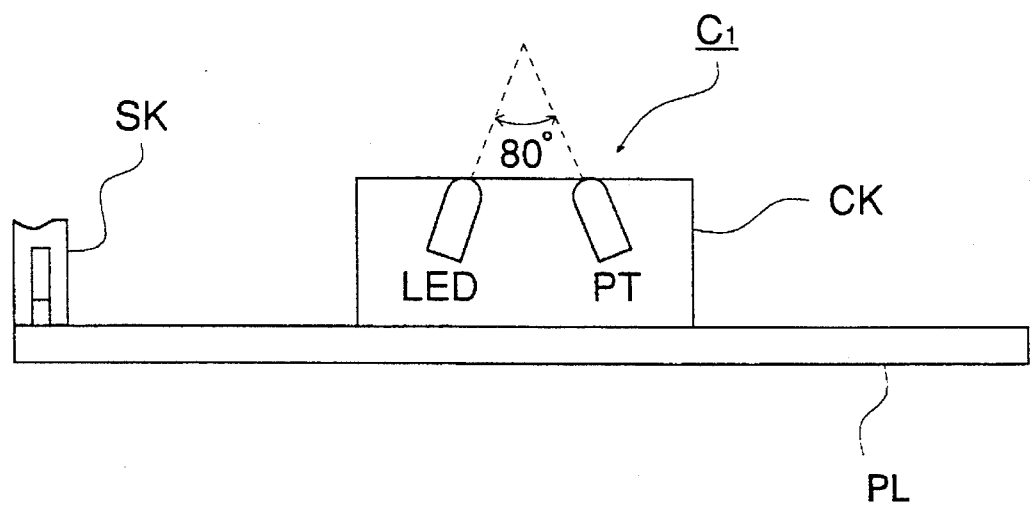
Figure 3:
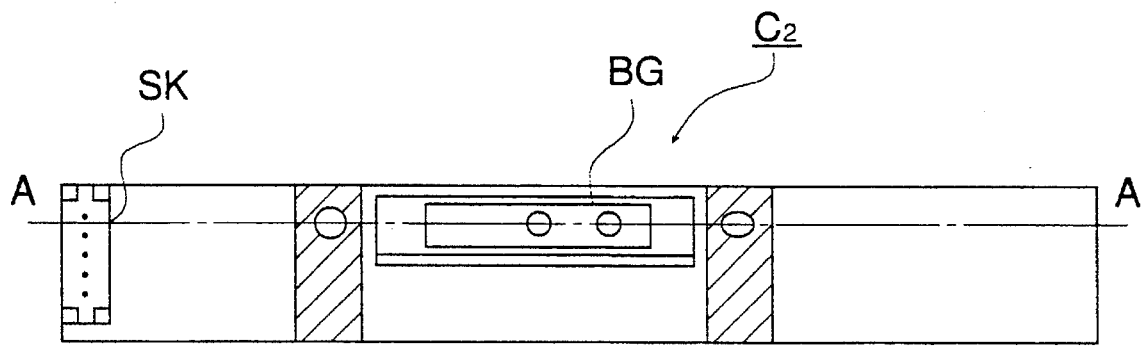
FIGS. 3(a) and 3(b) are views showing an image density sensor $C_2$ of this example.
Figure 3:
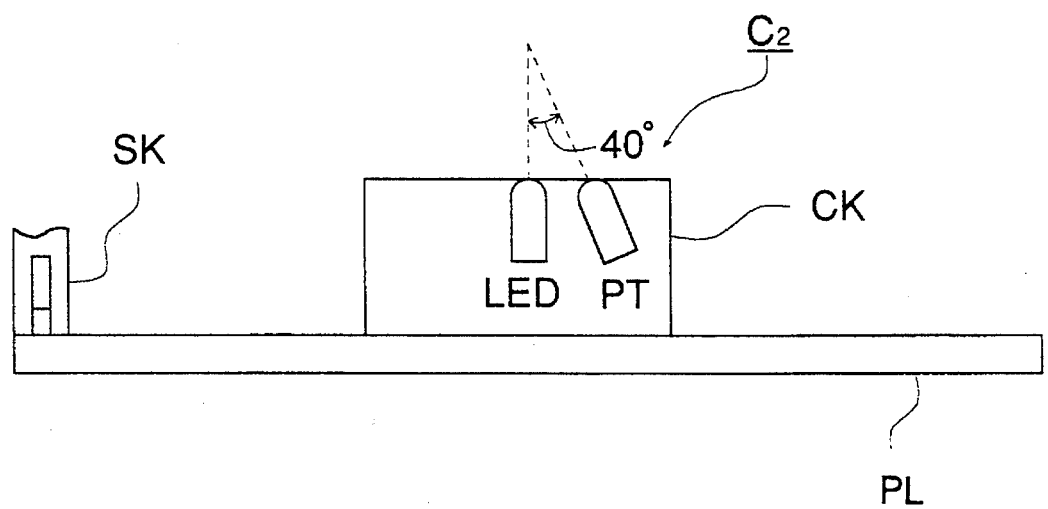

FIGS. 2(a), 2(b), 3(a) and 3(b) are views showing the image density sensors $C_1$ and $C_2$ of this example. FIGS. 2(a) and 3(a) are plan views, and FIG. 2(b) is a sectional view taken on line A—A in FIG. 2(a). FIG. 3(b) is a sectional view taken on line A—A in FIG. 3(a).

As illustrated in FIG. 2(b), the image density sensor $C_1$ is composed in the following manner. The image density sensor $C_1$ includes: a light emitting diode LED which emits infrared rays; and a photo-transistor PT, wherein grooves are formed in the casing CK in such a manner that the center of the light receiving face of the light emitting diode LED and that of the photo-transistor PT respectively form an angle of 40° and 40°. In this case, the light emitting diode LED and the photo-transistor PT are engaged with the grooves. This type image density sensor $C_1$ directly utilizes a beam of light to detect the reflecting density. This type image density sensor $C_1$ is excellent in the resolving power with respect to the predetermined density and the density close to it. Consequently, this type image density sensor $C_1$ is used for determining the maximum image density in this example. In this specification, this sensor will be referred to as an image density sensor $C_1$ used for detecting the maximum image density.

In the image density sensor $C_2$ shown in FIGS. 3(a) and 3(b), grooves are formed in the casing CK in such a manner that the center of the light receiving face of the light emitting diode LED and that of the photo-transistor PT respectively form an angle of 0° and 40°. As illustrated in FIG. 3(a), a dust-proof glass BG is provided on the front face of the groove. This type image density sensor positively utilizes the diffused light so as to detect the reflection density. Therefore, it is possible to detect all density from highlight to shadow. Accordingly, this type image density sensor is used for the γ correction control in this example. This type image density sensor will be referred to as an image density sensor $C_2$ for γ correction use in this specification, hereinafter.

The image density sensor C illustrated in FIG. 1 is composed of the image density sensors $C_1$ and $C_2$ described above.

The base plate PL supporting the casing CK is provided with a socket SK. The casing CK is supported by the base plate PL in such a manner that the casing CK is opposed to the center of the image carrier 110 while a clearance of 6 mm is formed between the casing CK and the surface of the image carrier 110, and the casing CK is arranged to be horizontal to the surface of the image carrier 110. Due to the foregoing structure, a beam of light reflected on the toner image can be effectively received.

Figure 4:
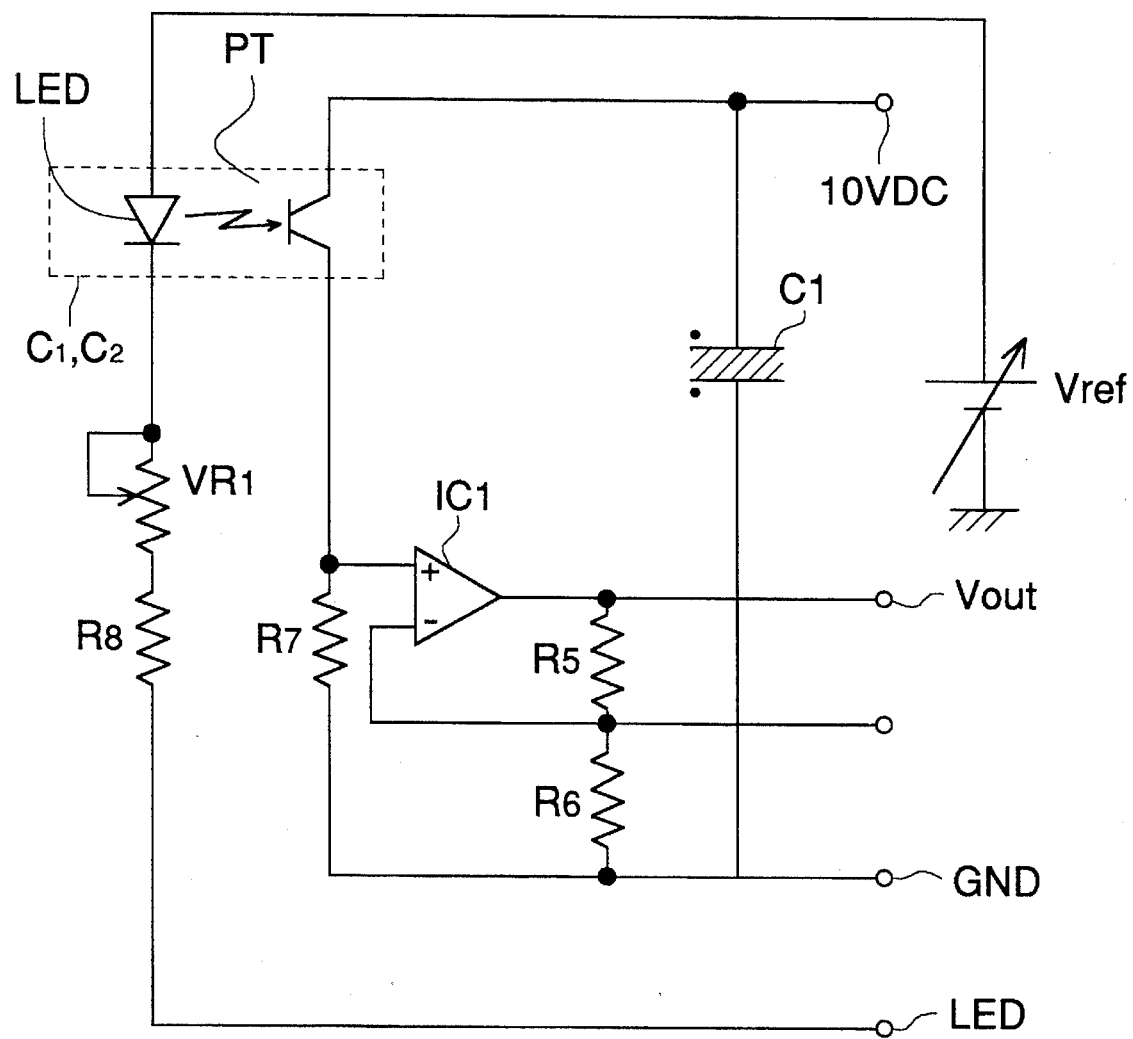
FIG. 4 is a circuit diagram of image density sensors $C_1$ and $C_2$ used in this example.

FIG. 4 is a circuit diagram of the image density sensors $C_1$ and $C_2$ used in this example.

In each of the image density sensors $C_1$ and $C_2$, the light emitting diode LED and the photo-transistor PT compose a photo-coupling. An anode terminal of the light emitting diode LED is connected with a variable DC power source $V_{ref}$, the maximum output of which is 10 V. A cathode terminal of the light emitting diode LED is connected with a semi-fixed resistor element VR1 capable of being changed over between 1 kΩ and 2 kΩ and also connected with a fixed resistor element R8. Due to the foregoing structure, the output voltage of the variable DC power source $V_{ref}$ is changed, so that the light emitting intensity of the light emitting diode LED can be adjusted. An anode terminal of the photo-transistor PT is connected with a DC power source $V_{DC}$, the output voltage of which is 10 V, and a cathode terminal is connected with an output detection circuit composed of the operation amplifier IC the fixed resistor element R7 for the purpose of the protection of the operation amplifier IC and the stable voltage to be applied to the operation amplifier IC, and the fixed resistor elements R5 and R6. Due to the foregoing structure, it is possible to detect a voltage corresponding to the intensity of light received by the phototransistor PT. Using the structure described above, the image density can be detected.

According to the image forming apparatus of this example, in order to improve the image productivity, the image density after fixation is indirectly obtained from the batch toner image made to be visual on the image carrier. In order to obtain the maximum image density, the developing property is fixed, and then the printer characteristic obtained from the patch toner image 2 is normalized.

CPU500 carries out the pre-charging processing and the adjustment processing of laser power. That is, CPU500 turns on the main motor (not shown). Due to the foregoing operation, the image carrier 110 starts rotating in the arrowed direction as shown in FIG. 1. Accordingly, the phase signal outputted from the encoder 115 is changed. Therefore, it is possible for CPU500 to detect the rotational phase of the image carrier 110.

By the control of CPU500, simultaneously when the image carrier 110 starts rotating, a predetermined output voltage is impressed upon the charger 120 by a high voltage power source (not shown). Due to the foregoing, the charger 120 starts discharging, so that the image formation region of the image carrier 110 is uniformly charged.

When the main power switch is turned on, by the action of CPU500, a solenoid (not shown) connected with the developing sleeve 131 and solenoids of the stirring screws 133a to 133C are turned on. Due to the foregoing, the developing sleeve 131 and the stirring screws 133A to 133C are rotated. When this stirring operation is continued for about 4 minutes from the start of warm-up, the developer is electrically charged at a predetermined intensity. After about 4 minutes have passed from the start of operation, the solenoids connected with the stirring screws 133A to 133C are turned off. Due to the above operation, the stirring operation of the developer is completed.

Figure 5:
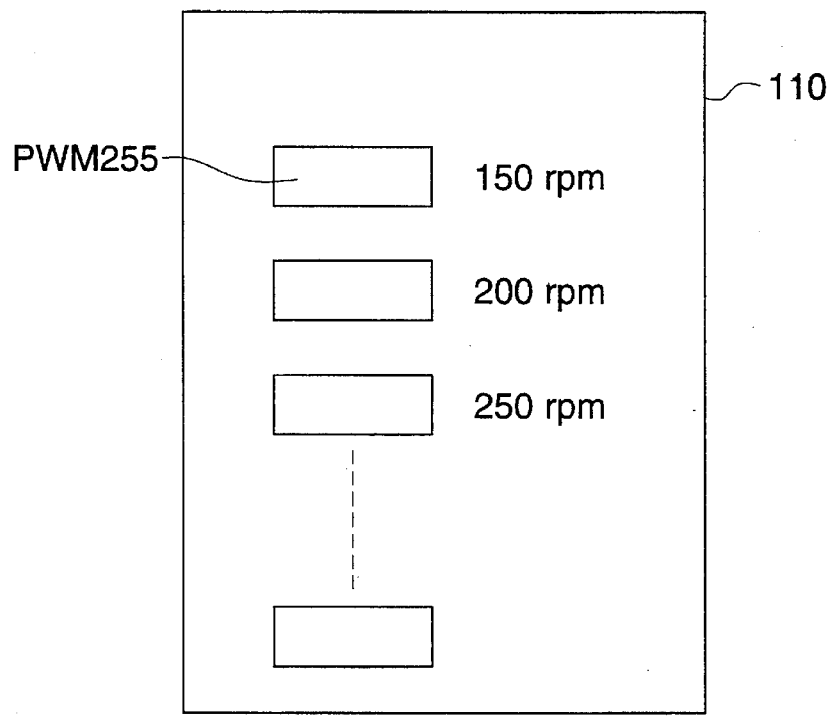
FIG. 5 is a schematic illustration showing a model of the patch toner image 1 expressing the gray scale on the image carrier.

FIG. 5 is a view showing a model of the patch toner image 1 which expresses the gray scale on the image carrier. A patch latent image formed on the image carrier 110 is made to be visual as follows. For example, at the level of PWM255 corresponding to the maximum image density, rectangular latent patch images of 20×30 mm are continuously formed at regular intervals of about 2 mm. While the rotational speed of the developing sleeve 131 is increased from 150 rpm by the step of 50 rpm, the latent patch image is made to be visual.

Figure 6:
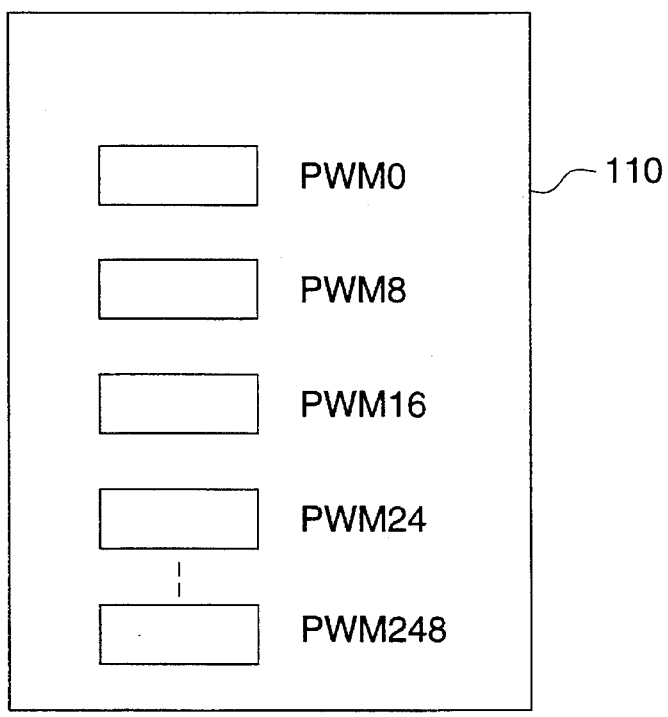
FIG. 6 is a schematic illustration showing a model of the patch toner image 2 expressing the gray scale on the image carrier.

FIG. 6 is a view showing a model of the patch toner image 2 which expresses the gray scale on the image carrier. A patch latent image formed on the image carrier 110 is made to be visual as follows. For example, rectangular latent patch images of 20×30 mm are continuously formed at regular intervals of about 2 mm. In the test patch shown in FIG. 6, a range from PWM0 to PWM248 is divided by 8 steps, however, when a highlight portion (PWM0 to 50) is divided by 2 steps, and when a portion of higher density is divided by 8 steps, the highlight portion can be detected more accurately. It is possible to employ a method in which the number of test patches is increased in a portion where the detection level is increased.

FIGS. 7(a) to 7(c) are graphs showing a procedure of forming a gradation correction curve from the patch toner image 1 formed on the image carrier.

FIG. 7(a) is a graph in which the output voltage (V) of the image density sensor $C_2$ and the PWM level are shown. In this case, the output voltage of the image density sensor $C_2$ corresponding to the reflection density under the condition that a toner image is not formed on the image carrier is adjusted to be 7 V. Then, the output voltage corresponding to the reflection density of a plurality of patch toner images expressing a gray scale of the 255 levels is expressed for each of 8 steps with respect to the maximum image density from 0 to 1.4.

FIG. 7(b) is a graph in which the printer characteristic is shown in the form of a relation between the image density and the PWM level. On the graph, the vertical axis shows an image density level. On this graph, the image density 1.4 is expressed by the 255 levels and graduated. The image density is obtained in such a manner that the reflection density data shown in FIG. 7(a) is subjected to logarithmic conversion. On the horizontal axis, the light emitting intensity of the semiconductor laser for providing the image density 1.4 is set at 255 levels in the initial stage.

FIG. 7(c) is a graph showing the gradation correction curve.

On the graph, the horizontal axis shows a image density level. The image density 1.4 is graduated by the 255 levels on the horizontal axis. On the vertical axis, the light emitting intensity of the semiconductor laser for providing the image density 1.4 is set at 255 levels in the initial stage. That is, FIG. 7(b) is provided when the data shown in FIG. 7(c) is replaced. These graph show a case in which a normal output voltage of the image density sensor $C_2$ can be provided.

Next, control operation of the image forming apparatus will be explained, in which the image forming process can be continued even in the case of an abnormal output of the image density sensor $C_2$. The image forming apparatus of this example detects an abnormal output of the image density sensor $C_2$ from the sensor output an the PWM level shown in FIG. 7(a).

Figure 8:
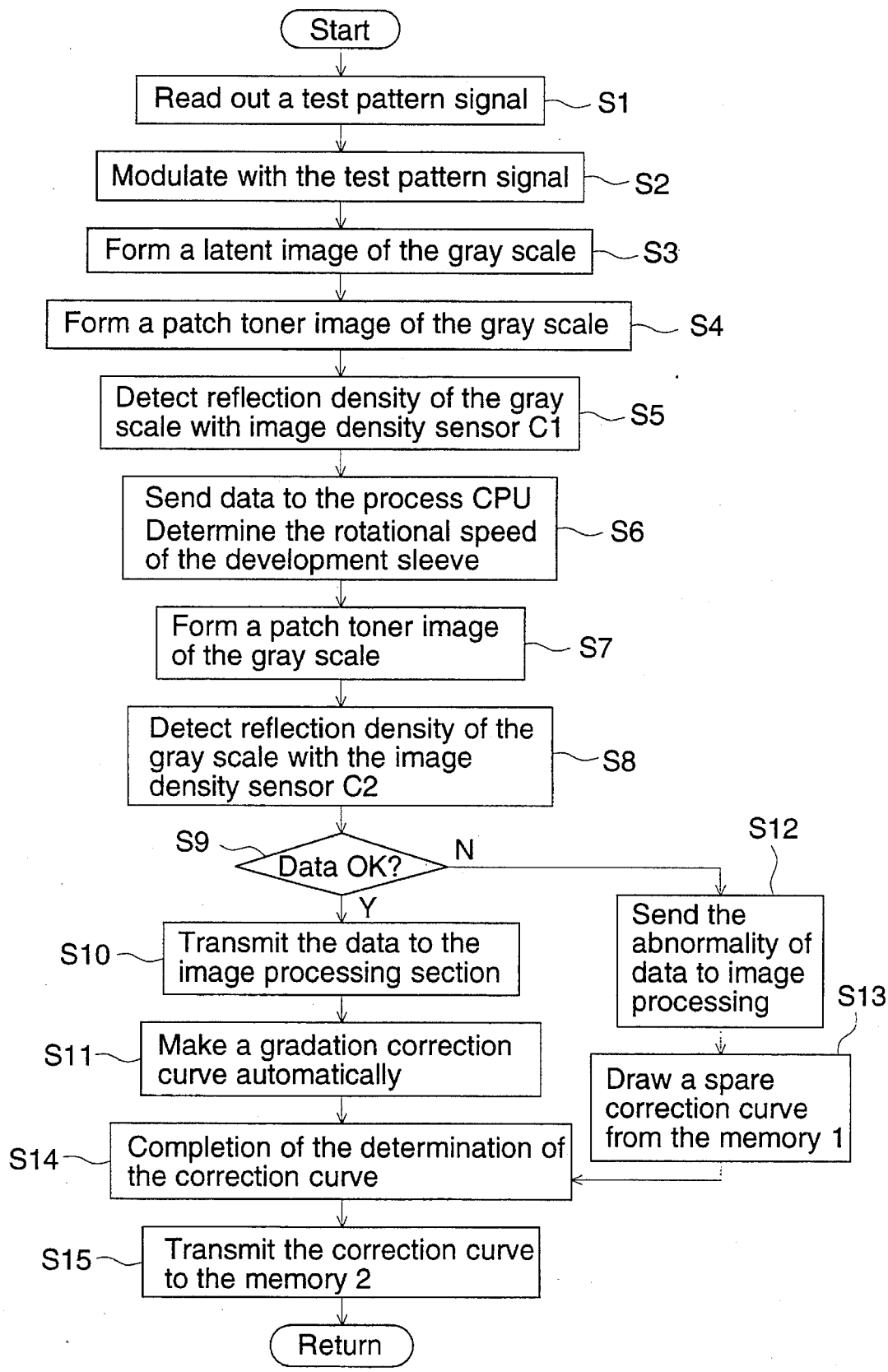
FIG. 8 is a flow chart showing a control operation of the image forming apparatus of this example.

FIG. 8 is a flow chart showing the control operation of the image forming apparatus of this example.

In the image forming apparatus of this example, after the above preprocessing has been completed, the maximum image density $D_{max}$ is fixed by the command of CPU500. Specifically, CPU500 sends a selection signal to the selector 350 composing the image processing section 300. The image processing section 300 sends a test patch signal $S_G$ expressing the gray scale from RAM340 to the writing unit 400 (step S1). The writing unit 400 sends a recording signal to the pulse width modulation circuit 410. The pulse width modulation circuit 410 sends a modulation signal to the LD drive circuit, wherein the modulation signal is obtained when a test patch signal $S_G$ corresponding to one scanning line is subjected to the pulse width modulation (step S2). The LD drive circuit 420 irradiates a laser beam when the semiconductor laser is oscillated by the modulation signal. This laser beam is reflected by a polygonal mirror rotated at a predetermined speed. Then the laser beam passes through the fθ lens and the first and second cylindrical lenses. In this way, scanning is conducted on the image carrier 110 by a minute spot of the laser beam (step S3).

After the completion of latent image formation has been detected by CPU500, a phase of the image carrier 110 is detected by the phase signal sent from the encoder 115, and then the developing unit 130 is driven synchronously with an electrostatic latent image. Due to the foregoing, as illustrated in FIG. 5, the latent image formed on the image carrier 110 is made to be visual in such a manner that rectangular patch toner images of 20×30 mm are made to be visual at the regular intervals of about 2 mm by a plurality of times (step S4). At this time, the exposure level of making the test patches is PWM255 which is the maximum exposure amount. The thus obtained latent image is developed using the developing sleeve 131, wherein the rotational speed of the developing sleeve 131 is changed. The rotational speed of the developing sleeve 131 is raised from 100 rpm to 450 rpm by the step of 25 rpm. A plurality of gray-scale-like patch toner images made at that time are read by the image density sensor $C_1$ (step S5). Due to the foregoing, the photo-diode PT outputs a signal corresponding to the intensity of light reflected on the visual test patch on the image carrier 110, to CPU500, and the rotational speed of the developing sleeve 131 is determined (step S6).

When the sensor output is 1.5 V, which corresponds to the fixing image density 1.4 measured by the image density meter manufactured by Makubesu Co., and when the sensor output coincides with a value inputted into CPU or becomes lower than the value, CPU controls the operation of the development sleeve 131 so that the rotational speed of the development sleeve 131 can be fixed.

In this case, CPU500 is operated as follows. After the completion of determining the rotational speed of the developing sleeve 131 has been detected, the phase of the image carrier 110 is detected from the phase signal sent out from the encoder 115, and the developing unit 130 is driven synchronously with an electrostatic latent image. Due to the foregoing, as illustrated in FIG. 6, rectangular latent images formed on the image carrier 110 are made to be visual so that the patch toner images of 20×30 mm are made to be visual at the regular intervals of about 2 mm (step S7).

CPU500 detects a phase of the image carrier 110 using a phase signal sent from the encoder 115, and a light emitting diode LED composing the image density sensor $C_2$ is set as follows. An output voltage of the variable DC power source $V_{ref}$ is changed and set at a value so that a sensor output of a portion where the toner patch does not exist can be 7 V.

A plurality of gray-scale-like patch toner images made after that are read out by the image density sensor $C_2$ (step S8).

CPU500 judges whether or not the output value of the image density sensor $C_2$ is normal (step S9). Specifically, it is judged to be normal when the sensor output is lowered in accordance with an increase in the PWM level. The lowered level is different depending upon the PWM value. Actually, the sensor output is subjected to A/D conversion. Therefore, it is judged by the A/D value. It is judged to be abnormal when an output of the sensor is lower than an output of the adjacent sensor by 5 V. In the case of an increase in the sensor output, in the same manner, it is judged to be abnormal when an output of the sensor is higher than an output of the adjacent sensor by 5 V. The abnormality of data is sent out to the image processing circuit (step S12). Except for cases in which the PWM values are lower than 40, it is judged to be abnormal when not less than 3 pieces of sensor output data are the same. When the output data is judged to be normal, CPU500 sends the sampling data to LUT320 (step S10).

CPU500 automatically makes the gradation correction curve (step S11).

The maximum image density is fixed at 1.4 by the rotational speed of the developing sleeve 131. Accordingly, it is necessary that the calculated density value of the sensor output −log (the sensor output at the PWM255 level/7 V) is also 1.4. The sensor output of PWM248 is approximately the same as the sensor output of PWM255. Therefore, it is necessary that −log (the sensor output at the PWM248 level/7 V) is also 1.4. When the obtained calculated value of density is normalized with 1.4 which is the maximum image density, the printer characteristic can be provided. Concerning the density of PWM0, since the image density on an actual transfer sheet has the density of the transfer sheet, the density of the transfer sheet is added to the calculated value of density which has been obtained. In this way, the following expression can be set up.

(Density of fixed image measured by density meter)= (Density of test patch on image carrier obtained from sensor output).

It is preferable that data of the calculated value can be changed according to a transfer sheet. In this case, a typical density 0.08 is added to the density data. Due to the foregoing, the correction curve determination processing is completed (step S14). Depending upon the characteristic of developer (electric charge, toner concentration, fluidity and the like) and also depending upon the surface potential of the photosensitive layer, the rotational speed of the developing sleeve is fixed at about 225 rpm at the normal temperature and humidity (20° C. and 50%). In this case, the rotational speed of 225 rpm corresponds to a ratio 1.60 of the linear speed of the developing sleeve to the linear speed of the image carrier.

CPU500 writes the correction curve generated by LUT320, in RAM330 (step S15). In this case, data of temperature and humidity representing the environmental condition may be written together with the correction curve, and also data of the number of copies for estimating the deterioration with time may be written together with the correction curve.

However, when CPU500 detects that the sensor output is not lowered in step S9 even if the PWM level is increased, or when CPU500 detects that the sensor output is increased or constant, the backup flag is set up (step S12). In accordance with the backup flag, CPU500 reads out the data composing a backup correction curve from LUT320 and sends the data to RAM330 (step S13). In this case, when only one backup curve is read out, it is used, and when a plurality of backup curves are read out, an arbitrary one is selected while consideration is given to the temperature and humidity data and the number of copies. At the same time, the backup correction curve that has been read out from RAM 330 is sent to the selector 350. Due to the foregoing, the correction curve is determined (step S14). CPU500 does not write the correction curve in RAM330 (step S15).

Figure 9:
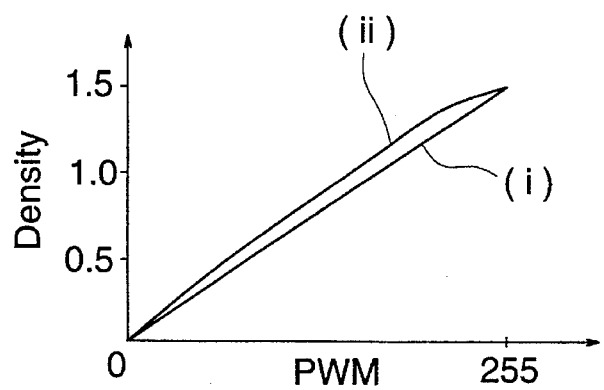
FIG. 9 is a graph showing a result of image formation conducted by the image forming apparatus of this example.
Figure 10:
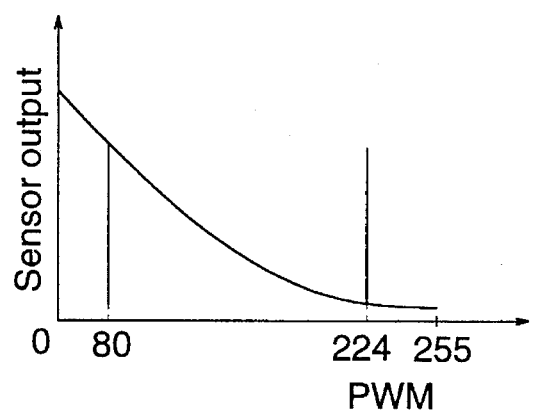
FIGS. 10(a) and 10(b) are graphs showing an example of the occurrence of abnormality of the output of the image density sensor.
Figure 10:
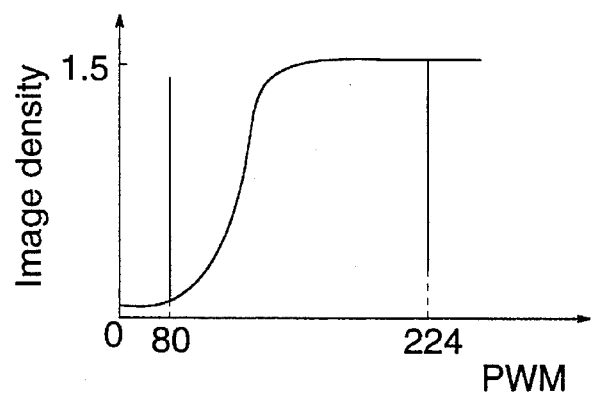

FIG. 9 is a graph showing the result of image formation conducted by the image forming apparatus of this example.

The vertical axis represents the image density. In this case, the image density on a transfer sheet was measured by a density meter. The horizontal axis represents the PWM level. In the graph shown in FIG. 9, curve (ii) shows a result of image formation in which the correction curve was used. Curve (i) shows a result of image formation, the process of which was carried out using a correction curve made through steps S10, S11 and S14 shown in FIG. 8. There was a small difference between the density data expressed by curve (i) and that expressed by curve (ii), however, image quality was not so lowered.

The present invention provides the following effects. When the gradation correction curve is not made, a gradation correction curve that has been previously made is inputted. Due to the foregoing, the image quality can be maintained high, and further the time of operation stop can be reduced.

What is claimed is:

1. An image forming apparatus, comprising:
   (a) an image carrier;

(b) exposure means for exposing a first plurality of latent patch images formed by plural exposures of a maximum luminance onto said image carrier;

(c) developing means for developing said first plurality of latent patch images to form a first plurality of toner images by changing a rotational speed of a developing sleeve of said developing means;

(d) first detecting means for detecting the reflection density of each of said first plurality of toner images;

(e) determining means for determining a rotational speed at which the reflection density detected by said first detecting means coincides with or becomes lower than a predetermined value;

(f) said exposure means exposing a second plurality of latent patch images formed by exposures of different luminance onto said image carrier;

(g) said developing means developing said second plurality of latent patch images to form a second plurality of toner images while rotating said developing sleeve at said rotational speed determined by said determining means;

(h) second detecting means for detecting the reflection density of each of said second plurality of toner images; and (i) correction curve forming means for forming a correction curve of gradation on the basis of the reflection densities detected by said second detecting means, wherein said exposure means exposes said image carrier in accordance with said correction curve of gradation formed by said correction curve forming means.

2. The image forming apparatus of claim 1 further comprising:

memory means for storing a predetermined gradation correction curve to be used as a substitute for said correction curve of gradation formed by said correction curve forming means; and selection means for selecting said predetermined gradation correction curve, when said correction curve formed by said correction curve forming means cannot be obtained.

\* \* \* \* \*